United States Patent [19]
Bushnell et al.

[11] Patent Number: 5,393,541
[45] Date of Patent: Feb. 28, 1995

[54] PREVENTION OF ELECTRODE FOULING IN HIGH ELECTRIC FIELD SYSTEMS FOR KILLING MICROORGANISMS IN FOOD PRODUCTS

[75] Inventors: Andrew H. Bushnell, San Diego; Reginald W. Clark, Del Mar; Joseph E. Dunn, Vista; Samuel W. Lloyd, La Mesa, all of Calif.

[73] Assignee: Foodco Corporation, San Diego, Calif.

[21] Appl. No.: 178,745

[22] Filed: Jan. 6, 1994

[51] Int. Cl.$^6$ ................................. A23L 3/32
[52] U.S. Cl. ...................... 426/237; 99/451; 99/483; 99/DIG. 14; 426/234; 426/241
[58] Field of Search ............. 99/451, 483, DIG. 14, 99/516, 536, 358; 426/234, 237, 238, 521, 247, 241; 422/22–24; 219/700, 735; 392/338, 497; 204/302, 304, 182.1, 157.15

[56] References Cited

U.S. PATENT DOCUMENTS

| | | |
|---|---|---|
| 4,457,221 | 7/1984 | Geren .................. 99/451 |
| 4,458,153 | 7/1984 | Wesley ................ 250/435 |
| 4,524,079 | 6/1985 | Hofmann ............. 426/234 |
| 4,608,920 | 9/1986 | Scheglov ............ 392/338 X |
| 4,695,472 | 9/1987 | Dunn et al. ........ 426/237 |
| 4,787,303 | 11/1988 | Papchenko et al. ... 99/451 |
| 4,838,154 | 6/1989 | Dunn et al. ......... 99/451 |
| 4,994,160 | 2/1991 | Doevenspeck ....... 204/165 |
| 5,031,521 | 7/1991 | Grishko et al. ..... 99/483 X |
| 5,048,404 | 9/1991 | Bushnell et al. ...... 99/451 |
| 5,235,905 | 8/1993 | Bushnell et al. .... 99/DIG. 14 |
| 5,256,430 | 10/1993 | Suzuki et al. ....... 426/237 |

FOREIGN PATENT DOCUMENTS 1946267 1/1976 Germany .
2907887 9/1980 Germany .

*Primary Examiner*—Timothy F. Simone
*Attorney, Agent, or Firm*—Fitch, Even, Tabin & Flannery

[57] ABSTRACT

Microorganisms are killed in a food product using an electrode placed into electrical contact with the food product, a charge supply circuit, a switch that selectively couples the charge supply circuit to the electrode, and a controller. The switch first configures the charge supply circuit so as to deliver a charge to the electrode when the switch assumes a first state, and next configures the charge supply circuit so as to absorb the charge from the electrode when the switch assumes a second state. As a result, a net charge delivered to the electrode is substantially zero. The controller controls the switch to sequentially assume the first and second states. The delivery of the zero net charge prevents the fouling of the electrode.

27 Claims, 5 Drawing Sheets

PREVENTION OF ELECTRODE FOULING IN HIGH ELECTRIC FIELD SYSTEMS FOR KILLING MICROORGANISMS IN FOOD PRODUCTS

BACKGROUND OF THE INVENTION

The present invention relates to processing of food products, and more particularly to processing systems and methods for killing microorganisms in fluid food products or foodstuffs, which systems and methods extend the shelf life of such food products or foodstuffs. Even more particularly, the present invention relates to the prevention of electrode fouling in such systems and methods.

Substantial technical effort has been directed to the preservation of perishable fluid food products such as milk products, natural fruit juices and liquid egg products which may normally contain a wide variety of micro-organisms, and which are excellent culture media for microorganisms.

Practical preservation methods which have found significant commercial application predominantly utilize heat treatment such as pasteurization to inactivate or reduce the microorganism population. For example, milk products are conventionally pasteurized at a minimum temperature of at least about 72° C. for 15 seconds (or equivalent time/temperature relationship) to destroy pathogenic bacteria and most of the nonpathogenic organisms, with degradative enzyme systems also being partially or totally inactivated. However, products processed in this manner are still generally nonsterile and have limited shelf life, even at refrigeration temperature. The shelf life of liquid foodstuffs may be substantially extended by higher heat treatment processes such as "ultra high pasteurization", or "ultra high temperature" ("UHT"). Such treatments vary in times and temperatures for different industries and food products. A typical treatment would be to maintain the product at a temperature of 140° C. for four seconds. These processes are used in conjunction with aseptic packaging to achieve complete destruction of all bacteria and spores within the food product. However, such heat treatment typically adversely affects the flavor of the food product, at least partially denatures its protein content or otherwise adversely affects desired properties of the fluid food product. Other approaches to liquid food preservation, which also have certain disadvantages, include the use of chemical additives or ionizing radiation.

The bactericidal effects of electric currents have also been investigated since the end of the 19th century, with various efforts having been made to utilize electrical currents for treating food products. Such efforts are described in U.S. Pat. Nos. 1,900,509, 2,428,328, 2,428,329 and 4,457,221 and German Patents 1,946,267 and 2,907,887, all of which are incorporated herein by reference. The lethal effects of low-frequency alternating current with low electric field strength have been largely attributed to the formation of electrolytic chemical products from the application of current through direct contact electrodes, as well as ohmic heating produced by current flow through an electrically resistive medium. As described in U.S. Pat. No. 3,594,115, incorporated herein by reference, lethal effects of high voltage arc discharges have also been attributed to electrohydraulic shock waves. However, the electrolytic chemical products generated by low frequency, low electric field methods may be undesirable in fluid foodstuffs. Moreover, the utilization of explosive arc discharges to produce microbiologically lethal shock waves has not found wide-spread application as it is not a very effective means for preserving edible liquid foodstuffs and, in addition produces undesirable chemical by-products in the foodstuffs.

More recently, separately from the art of food preservation, the effect of strong electric fields on microorganisms in nonnutrient media has been studied as a mechanism for reversibly or irreversibly increasing the permeability of the cell membrane of microorganisms and individual cells. See, e.g., Sale, et al., "Effects of High Electric Fields on Microorganisms III. Lysis of Erythrocytes and Protoplasts", Biochmica et Biophysica Acta, 163, pp. 37–43, inter alia, (1968); Hulsheger, et al., "Killing of Bacteria with Electric Pulses of High Field Strength", Radiat. Environ Biophys, 20, pp. 53–65, inter alia, (1981); Hulsheger, et al., "Lethal Effects of High-Voltage Pulses on $E.\ coli$ K12", Radiat. Environ. Biophys. 18, pp. 281–288, inter alia, (1980); Zimmermann, et al., "Effects of External Electrical Fields on Cell Membranes", Bioelectrochemistry and Bioenergetics, 3, pp. 58–63, inter alia, (1976); Zimmermann, et al., "Electric Field-Induced Cell-to-Cell Fusion", J. Membrane Biol., 67, pp. 165–182, inter alia, (1982); Hulsheger, et al., "Electric Field Effects on Bacteria and Yeast Cells", Radiat. Environ. Biophys; 22, pp. 149–162, inter alia, (1983); U. Zimmermann, et al., "The Development of Drug Carrier Systems: Electrical Field Induced Effects in Cell Membranes", Biochemistry and Bioenergetics, 7, pp. 553–574, inter alia, (1980); Jacob, et al., "Microbiological Implications of Electric Field Effects II. Inactivation of Yeast Cells and Repair of Their Cell Envelope", Zeitschrift fur Allgemeine Mikrobiologic, 21, 3, pp. 225–233, inter alia, (1981); Kinositas, Jr., "Formation and Resealing of Pores of Controlled Sizes in Human Erythrocyte Membrane", Nature, 268, 4, pp. 438–440, inter alia, (August, 1977); and Neamann, et al., "Gene Transfer into Mouse Lyoma Cells by Electroporation in High Electric Fields", IRI Press Limited, Oxford, England, pp. 841–845.

The application of high electric fields to reversibly increase the permeability of cells has been used to carry out cell fusion of living cells and to introduce normally excluded components into living cells. Electric fields in nonnutrient media can also have a direct irreversible lethal effect upon microorganisms with the rate of kill dependent upon the field strength above a critical field level and the duration of the applied high electric field.

These studies postulate the cell membrane as the site of a critical effect, of reversible or irreversible loss of membrane function as the semipermeable barrier between the cell and its environment. An external field of short duration is assumed to induce an imposed transmembrane potential above a critical electric field value, which may produce a dramatic increase of membrane permeability. Because an increase in cell permeability prevents the counteracting of differences in osmality of the cell content and surrounding media, exchange or loss of cell contents, cell lysis and irreversible destruction may occur as secondary mechanisms in nonnutrient media which limit the ability of cells to repair themselves, and which adversely affect permeable cells through osmotic pressure differences between the medium and the interior of the cell.

A pulsed field treatment apparatus, which uses very high electrical field pulses of very short duration, is shown in U.S. Pat. No. 5,048,404 issued to Bushnell et al. (the '404 Patent), incorporated herein by reference. Generally, in accordance with the '404 Patent, methods and apparatus are provided for preserving fluid foodstuffs (or pumpable foodstuffs), which are normally excellent bacteriological growth media, by applying very high electrical field pulses of very short duration through all of the foodstuff.

By "pumpable foodstuff" is meant an edible, food product having a viscosity or extrusion capacity such that the food product may be forced to flow through a treatment zone. The products include extrudable products, such as doughs or meat emulsions, fluid products such as beverages, fluid dairy products, gravies, sauces and soups, and food-particulate containing food slurries such as stews, and food-particulate containing soups, and cooked or uncooked vegetable or grain slurries.

By "bacteriological growth medium" is meant that upon storage at a temperature in the range of 0° C. to about 30° C., the fluid foodstuff, with its indigenous microbiological population or when seeded with test organisms, will demonstrate an increase in biological content or activity as a function of time as detectable by direct microscopic counts, colony forming units on appropriate secondary media, metabolic end product analyses, biological dry or wet weight or other qualitative or quantitative analytical methodology for monitoring increase in biological activity or content. For example, under such conditions the microbiological population of a pumpable foodstuff which is a bacteriological growth medium may at least double over a time period of two days.

The compositions of typical fluid food products which are biological growth media, derived from "Nutritive Value of American Foods in Common Units", Agriculture Handbook No. 456 of the U.S. Department of Agriculture (1975), are as follows:

| Fluid Food Product | FLUID FOODSTUFFS | | | | | |
|---|---|---|---|---|---|---|
| | Water Wt % | Protein Wt % | Fat Wt % | Carbohydrate Wt % | Na Wt % | K Wt % |
| Whole Milk (3.5% fat) | 87.4 | 3.48 | 3.48 | 4.91 | .05 | .144 |
| Yogurt** | 89.0 | 3.40 | 1.68 | 5.22 | .050 | .142 |
| Raw Orange Juice | 88.3 | .685 | .20 | 10.0 | .0008 | .2 |
| Grape Juice | 82.9 | .001 | tr. | .166 | .0019 | .115 |
| Raw Lemon Juice | 91.0 | .41 | .20 | 8.0 | .0008 | .14 |
| Raw Grapefruit Juice | 90.0 | .48 | .08 | 9.18 | .0008 | .16 |
| Apple Juice | 87.8 | .08 | tr. | 11.9 | .0008 | .10 |
| Raw Whole Eggs | 73.7 | 12.88 | 11.50 | .90 | .12 | .13 |
| Fresh Egg Whites | 87.6 | 10.88 | .02 | .79 | .15 | .14 |
| Split Pea Soup* | 70.7 | 6.99 | 2.60 | 16.99 | .77 | .22 |
| Tomato Soup* | 81.0 | 1.60 | 2.10 | 12.69 | .79 | .187 |
| Tomato Catsup | 68.6 | 2.0 | .588 | 25.4 | 1.04 | .362 |
| Vegetable beef soup | 91.9 | 2.08 | .898 | 3.9 | .427 | .066 |

*condensed - commercial
**from partially skimmed milk

Electrical fields may be applied by means of treatment cells of high field stability design which are described in detail by Bushnell et al. Basically, the foodstuff is electrically interposed between a first electrode, and a second electrode. The electrical field is generated between the first and second electrodes such that the electrical field passes through the foodstuff, thereby subjecting any microorganisms therein to the electrical field. Generally, the second electrode consists of a grounded electrode, and a relatively higher or lower voltage potential is applied to the first electrode. Various embodiments of such methods and apparatus use electric field processing to both preserve and heat for the combined benefit of electric field treatment at slightly elevated temperature. The use of de-gassing methods and apparatus to facilitate the use of high electric fields is another aspect of the '404 Patent discussed in more detail therein.

In the '404 Patent all of the pumpable fluid foodstuff is subjected to at least one very high field and current density electric pulse, and at least a portion of the fluid foodstuff is subjected to a plurality of very high voltage electric pulses in a high stability electric pulse treatment zone. The pumpable food product is subjected to such very high voltage short duration pulses by a variety of processing techniques. In one such processing method, the liquid foodstuff is introduced into a treatment zone, or cell, between two electrodes which have a configuration adapted to produce a substantially uniform electric field thereinbetween without dielectric tracking or other breakdown. Very high electric field pulses are applied to the electrodes to subject the liquid foodstuff to the multiple pulse treatment by pulsed field apparatus such as lumped transmission line circuits, Blumlein transmission circuits and/or capacitive discharge circuits. Alternatively, Bushnell et al., use field reversal techniques in capacitive discharge systems or pulse forming networks to increase the effective potential across the cell. For example, by applying a short electric field pulse of 20,000 volts per centimeter across a treatment cell for a short period of time (e.g., 2 microseconds) of one polarity, followed by abrupt reversal of the applied potential within a short time period (e.g., 2 microseconds), the '404 Patent achieves an effective field approaching 40 kilovolts per centimeter across the cell.

If the liquid foodstuff is continuously introduced into the treatment zone to which very high electric field pulses are periodically applied, and fluid foodstuff is concomitantly withdrawn from the treatment zone, the rate of passage of the liquid foodstuff through the treatment zone is coordinated with the pulse treatment rate so that all of the pumpable foodstuff is subjected to at least one electric field pulse within the treatment zone. The liquid foodstuff may be subjected to treatment in a sequential plurality of such treatment zones, or cells, as is described in more detail in the '404 Patent.

Problematically, in processing some food products, such as milk or rich protein solutions, using the apparatus and method of the '404 Patent or the like, a film of material can collect, or agglomerate, on the first and/or second electrode. This film of materials can consist of proteins and/or other materials (referred to herein as a fouling agent or polluting agent) that are present in the milk, or other protein rich material. The formation of the film, or fouling of the electrode(s), is believed to be due to the electrophoretic concentration of charged molecules within a boundary layer of food product that is adjacent to the treatment electrode. It has been noted that, for example, when the food product consists of raw milk, the fouling occurs only on the anode (i.e., the electrode to which electrons flow); the cathode (i.e., the electrode from which electrons flow) remains relatively free of any film buildup or agglomeration. Unfortunately, this agglomeration of the fouling agent on the electrode(s) during extended processing periods can cause electrical breakdown in the cell, fouling or contamination of the system, and in some cases can even cause the flow of fluid food product to stop. For some products, significant fouling of the electrode (or electrodes) can occur after only a few minutes of system operating time. For other products the time before which the fouling of the electrode (or electrodes) becomes significant can be a few hours or longer.

One attempt to solve a similar problem—electrolysis—is shown in U.S. Pat. No. 4,695,472, issued to Dunn and Pearlman. In accordance with the teachings of the '472 Patent, the suggestion is made that the first and second electrodes can be constructed so as to prevent direct electrolysis of the fluid foodstuff upon application of a pulsed electric field thereto. That is, such electrodes may comprise an electrically conductive electrolysis electrode, an ion permeable membrane and an intermediate electrolyte, such that ionic electrical connection is made with the fluid foodstuff through the ion permeable membrane rather than by direct contact with the electrically conductive electrode. Problematically, however, such electrolysis electrodes do not address the problem of electrophoresis, and they require the use of costly and cumbersome additional components in the pulsed field treatment apparatus.

Therefore, improvements are needed in the preservation of such high energy electrodes.

SUMMARY OF THE INVENTION

The present invention provides an apparatus and method for killing microorganisms in a food product and for preventing the fouling of a high-energy electrode in such apparatus.

In operation, the electrode is placed into electrical contact with a supply of the food product. In order to kill the microorganisms, a high electric field, i.e., greater than 5 kV/cm, and typically greater than 10 kV/cm, is applied to the foodstuff or food product. A current is generated by a charge supply circuit that is coupled by a switch (or switching device) to the electrode for a predetermined period of time. Problematically, this current flow causes the agglomeration of a fouling agent on the electrode, thereby fouling the electrode and causing the problems described above.

In order to address this problem, the switching device of one embodiment of the invention sequentially configures the charge supply circuit so as to deliver a first current to the electrode, and next configures the charge supply circuit to absorb a second current from the electrode. (The charge supply circuit may be referred to as a charge zeroing network when it is absorbing the second current from the electrode.) The first current is delivered in response to the switch assuming a first state, and the second current is absorbed in response to the switch assuming a second state. The first and second states are assumed for first and second time periods respectively, such that the first current and first time period define a first charge, and the second current and the second time period define a second charge. The first and second charges are made to be equal charges, the first being delivered and the second being absorbed by the electrode, by appropriately selecting the first and second currents and the first and second time periods. Thus, the net charge delivered to the electrode is substantially zero after the first and second time periods. It has been found that this zero net charge delivery substantially prevents the agglomeration of the fouling agent on the electrode. The sequential process of delivering the first and second currents for the first and second time periods, respectively, is repeated for so long as operation of the pulsed field treatment apparatus is desired.

A controller is coupled to the switch and controls the switch to assume the first and second states for the first and second prescribed periods. The controller may assume a variety of known forms including a simple timing circuit, or a complex digital or analog computer system.

Thus, the invention may be characterized as an apparatus for preventing or reducing the fouling of an electrode in electrical contact with a supply of food product. The food product contains the fouling agent that agglomerates on the electrode in response to the passing of a net charge to the electrode, and the agglomeration of fouling agent causes the fouling of the electrode. The apparatus includes (1) a charge supply circuit that is coupled to the electrode; and (2) a switch that is coupled to the charge supply circuit. The switch has a first state in which the switch configures the charge supply circuit to deliver a charge to the electrode, and a second state in which the switch configures the charge supply circuit to substantially absorb the charge from the electrode. The apparatus also includes (3) a controller, coupled to the switch, that controls the switch to assume the first state and the second state during a prescribed period of time. Thus, the controller causes the net charge delivered to the electrode to be approximately zero during the prescribed period of time (by first causing the charge to be delivered, and next causing the charge to be absorbed). In this way the fouling of the electrode is substantially prevented.

The invention may also be characterized as a method for killing microorganisms in a food product. The method includes, first, (a) positioning an electrode in a supply of the food product. The food product contains the fouling agent that agglomerates on the electrode in response to the passing of a net charge between the electrode and the supply, and the agglomeration causes the fouling of the electrode. Second, (b) a first voltage signal is applied to the electrode for a first prescribed period of time, causing a first current to flow to the electrode. The first current and the first prescribed period define a first charge. Third, (c) a second voltage signal is applied to the electrode for a second prescribed period of time, causing a second current to flow from the electrode. The second current and the second prescribed period of time define a second charge, and the first charge and the second charge are equal charges. As a result, the net charge transferred to the electrode after the first prescribed period of time and the second prescribed period of time is approximately zero, and therefore, the agglomeration of the fouling agent on the electrode is substantially prevented. The sequential application of the first and second voltage signals can be repeated for a prescribed operating period, e.g., until microorganisms have been killed in a desired amount of the food product.

The switching device may also be described more broadly as an active or passive circuit that is coupled to the electrode. The net charge delivered by the circuit is substantially (or approximately) zero, with the magnitude of variation from zero being proportional to the rate of agglomeration on the electrode. Thus, in another embodiment the active circuit may deliver a plurality of currents for a corresponding plurality of time periods during the delivery period. No one of the plurality of currents, and its corresponding time period, when combined with any other of the plurality of currents, and its corresponding time period, need cause the delivery of the zero net charge. Instead, it is the combination of the plurality currents delivered during the delivery period that cause the delivery of the zero net charge to the electrode. In one specific example of this embodiment there are an infinite number of currents, each being delivered for an infinitely short time period during the delivery period, as would be the case, e.g., if a continuous current function were applied to the electrode. In this specific example, the net charge delivered is defined by:

$$Q = \int_0^{T_D} I(t)dt = 0 \qquad (1)$$

were Q is the charge delivered over the delivery period $T_D$, and wherein I(t) is the continuous current function. Because the last charge delivered to the electrode before the expiration of the delivery period results in the zero net charge being delivered, this last charge can be referenced to as the zeroing charge. Note that a discontinuous current function may also be defined by an infinite number of currents and infinitely short time periods and may thus also be used to practice the teachings of the present invention.

In a further embodiment, the passive circuit delivers the zero net charge. This is accomplished by utilizing the passive circuit coupled to a high voltage power supply and, in general, a switching device. The passive circuit defines a transconductance function G(s), wherein s is a generalized frequency (or complex frequency), and wherein G(0)=0, i.e., wherein the passive circuit does not pass d.c. in response to the high voltage power supply and the switch. Thus, the currents output from the passive circuit will define the zero net charge as follows:

$$Q = \int_0^{T_D} I(t)dt = 0 \qquad (2)$$

were Q is the charge delivered over the pulse period or delivery period $T_D$, and wherein I(t) is the continuous current function. As when the active circuit is used, the last charge delivered to the electrode before the expiration of the delivery period can be referred to as the zeroing charge.

It is thus a feature of the present invention to use an electrode to kill microorganisms in foodstuffs that contain a fouling agent so as to extend the shelf life of such foodstuffs.

It is thus another feature of the invention to control the delivery of current (and, as a result, electrical charge) to the electrode so as to reduce or substantially prevent the fouling of the electrode with the fouling agent during the process of killing the microorganisms.

It is a further feature of the invention to prevent or significantly reduce such fouling of the electrode without the need for complex and costly devices, such as ion permeable membranes.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
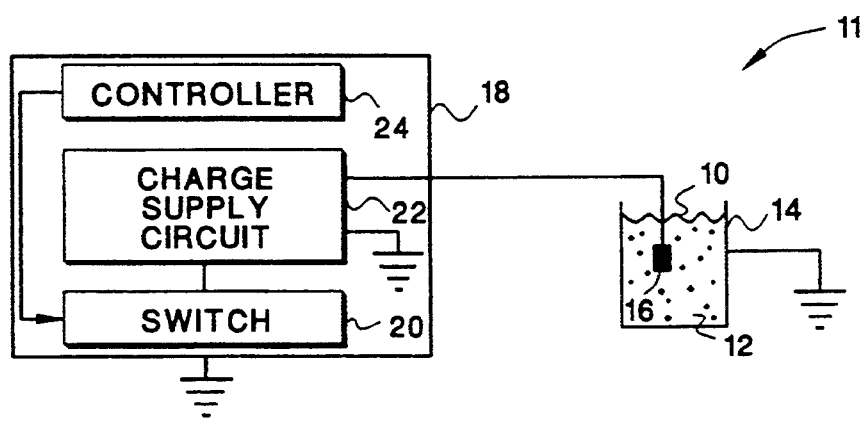
FIG. 1 is a block diagram showing a pulsed field treatment apparatus used for killing microorganisms in foodstuffs, and having features of the present invention for preventing the fouling of a high energy electrode used in such treatment apparatus.

Referring first to FIG. 1, a block diagram is shown of a pulsed field treatment apparatus 11 that is used for killing microorganisms in foodstuffs. The apparatus includes features of the present invention for preventing the fouling of a high energy electrode.

A liquid foodstuff 10 is circulated through a treatment zone 12 (or cell) so as to interpose the circulating foodstuff 10 between a first electrode 16 and a second electrode 14, which have a configuration adapted to produce a substantially uniform electric field thereinbetween without dielectric tracking or other breakdown. The cell 12 can thus be said to comprise the electrodes 14, 16, and a circulating space that is between the electrodes through which the foodstuff 10 circulates. Very high electric field pulses are applied to the electrodes 14, 16 to subject the liquid foodstuff 10 to pulsed field treatment by a pulsed field treatment circuit 18.

As described above, in processing some food products, such as milk or rich protein solutions, a film of material can collect, or agglomerate, on the first electrode 16 and/or second electrode 14. Unfortunately, this agglomeration of the film, or fouling agent, on the electrode(s) 14 and/or 16 during processing periods can cause electrical breakdown in the cell 12, fouling or contamination of the system, and in some cases can even cause the circulation of fluid food product through the cell 12 to stop.

Advantageously, in the apparatus 11 shown in FIG. 1, a switch (or switching device) 20 first sequentially configures a charge supply circuit 22 so as to deliver, e.g., a first current to the first electrode 16, and next configures the charge supply circuit 22 to absorb, e.g., a second current from the first electrode 16. (Note that the charge supply circuit 22 may more appropriately be referred to as a charge zeroing network when it is absorbing the second current from the first electrode 16).

Note that while the currents mentioned herein are described as being "delivered to" or "absorbed from" the first electrode 16, it is to be understood that in practice, the currents may not actually flow between the first electrode 16 and the food product 10. Instead, other electrochemical effects may account for an effective charge transfer through the cell 12, between the first and second electrodes 16, 14, e.g., ionic transport within the food product 10. In any case, it is accurate to describe the present invention as delivering a zero net charge to the first electrode 16, or achieving the zero net charge through the cell 12.

Alternatively, the invention may be viewed as "absorbing" or "delivering" current from/to the second electrode 14. The first electrode 16, is merely referred to herein for simplicity and by way of example. What is to be emphasized, is that the invention achieves the zero net charge transfer through the cell 12.

The first current is delivered in response to the switch 20 assuming a first state, and the second current is absorbed in response to the switch 20 assuming a second state, wherein the first and second states are assumed for first and second time periods respectively. The first current and first time period define a first charge, and the second current and the second time period define a second charge or zeroing charge. The first and second charges are equal charges, the first being delivered to the first electrode 16 and the second being absorbed from the first electrode 16. Thus, the net charge delivered to the first electrode 16 (and, as a result, through the cell 12) is substantially zero after a delivery period. Advantageously, it has been found that the zero net charge delivery substantially prevents the agglomeration of the fouling agent on the first electrode 16 and/or the second electrode 14. The sequential process of delivering the first and second currents for the first and second time periods, respectively, is repeated during successive delivery periods for so long as operation of pulsed field treatment apparatus is desired.

A controller 24 is coupled to the switch 20 and controls the switch 20 to assume the first and second states for the first and second prescribed time periods. The controller 24 may assume a variety of known forms including a simple timing circuit, or a complex digital or analog computer system, e.g., a personal computer.

Figure 2A:
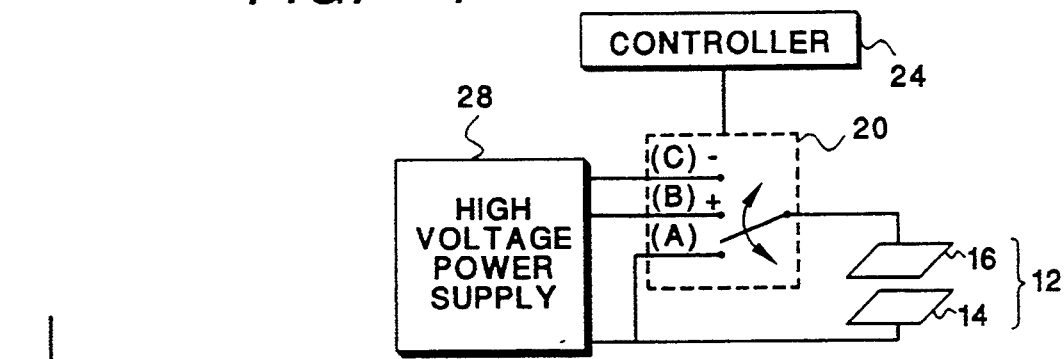
FIG. 2A is a schematic diagram of a first embodiment of the present invention as shown on FIG. 1 wherein an active circuit or switch is used to couple a high voltage power supply to an electrode.

Referring next to FIG. 2A, a schematic diagram is shown of a first embodiment of the present invention, wherein an active circuit or switch 20 selectively couples a high voltage power supply 28 (which in this embodiment comprises the charge supply circuit 22 of FIG. 1) to the first electrode 16.

Various types of active circuits (or active circuit devices), such as the switch 20 shown in FIG. 2A, may be utilized with the first embodiment. It is not essential that the active circuit cause generation of only the first and second currents, during only the first and second time periods, respectively as is described above by way of example. Therefore, it should be understood that a plurality of currents, each potentially having a different magnitude, and a plurality of time periods, each potentially having a different length, may be generated or used by the active circuit. Moreover, the active circuit may generate an infinite plurality of currents, in which case the plurality of time periods is an infinite plurality of infinitely small time periods. Together the plurality of currents and the plurality of time periods define a plurality of charges that, in accordance with the invention, together constitute the zero net charge.

It is also not essential that any one of the plurality of currents, and its corresponding time period, paired with any other of the plurality of currents, and its corresponding time period, result in the zero net charge. Rather, the zero net charge is delivered over a delivery period in response to the plurality of currents and the plurality of time periods that are produced by the active circuit during the delivery period. In practice, the zero net charge is thus delivered periodically, i.e., at the end of the delivery period, with delivery of a non-zero net charge being possible at any time during the delivery period. The length of the delivery period is selected as a function of the amount of fouling agent in the foodstuffs 10 being treated, and the proneness of the foodstuffs to separate from the fouling agent so as to allow the agglomeration of the fouling agent on the first or second electrode 16, 14. Specifically, foodstuffs 10 that are more prone to cause fouling of the first or second electrode 16, 14 will require the selection of a relatively shorter delivery period than those foodstuffs 10 that are less prone to cause fouling of the electrode.

Note also that in practice a sufficient number of the plurality of currents and time periods during each delivery period define charges that are sufficient to generate electric fields within the treatment zone 12 that are large enough to kill microorganisms. The sufficient number of the currents and time periods is selected based on the type of foodstuffs 10 being treated or processed, the flow rate, if any, of the foodstuffs through the treatment zone 12, and/or the type of microorganisms being killed.

As shown in FIG. 2A, the active circuit device may be the switch 20. The switch 20, assumes, e.g., a first state (a) for a delay period. Next, the switch 20 assumes a second state (b) for a first prescribed period during which a first current is delivered to the first electrode 16. The first prescribed period is optionally followed by an additional delay period during which the switch 20 again assumes the first state position (a). The switch 20 then assumes a third state (c) for a second prescribed period. While the switch 20 is in the third state (c), a second current is absorbed from the first electrode 16 by the power supply 28. The delay period, the first time period, the additional delay period and the second time period constitute the delivery period. The switch 20 assumes each of these states in response to the controller 24.

Figure 2B:
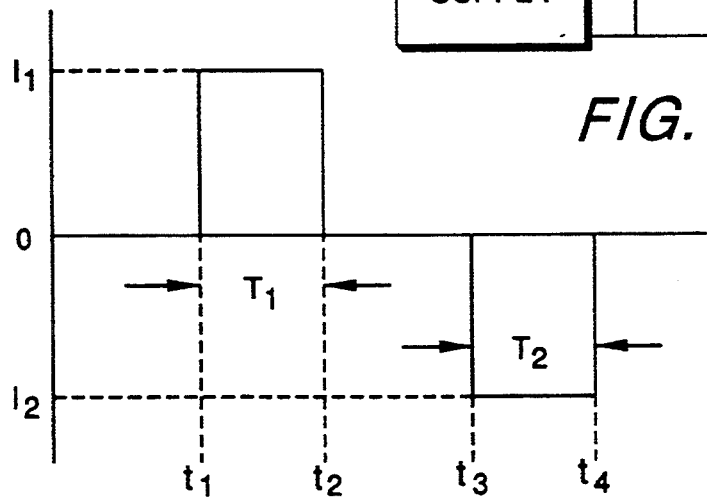
FIG. 2B is an exemplary graph showing a first current and a second current, generated by the first embodiment as shown in FIG. 2A, on the vertical axis, and showing a first time period and a second time period, during which the currents, respectively, are generated, on the horizontal axis.

A timing waveform diagram of this operation is shown in FIG. 2B. The first current $I_1$ and the first time period $T_1$ define the first charge that is delivered by the power supply 28, and the second current $I_2$ and the second time period $T_2$ define the second charge that is absorbed by the power supply 28. (In this embodiment, the power supply 28 can be referred to as the charge supply circuit during the first time period when it delivers the first current and as the charge zeroing circuit during the second time period when it absorbs the second current.) By appropriately selecting the first and second prescribed time periods, and the first and second currents, the first and second charges are made to be equal charges—the first being delivered to the electrode, and the second being absorbed by the electrode. For example, the first and second prescribed time periods might be two microsecond time periods, and the first and second currents might be 20,000 amp currents. Note that in this embodiment, both the first and second currents will generally be of sufficient magnitude to cause the killing of microorganisms in the supply of food product 10. In this way the substantially zero net charge is delivered to the first electrode 16 after the first and second time periods. As mentioned above, the delivery of the zero net charge substantially prevents the agglomeration of the fouling agent on the first electrode 16 and/or the second electrode 14.

The switch 20 may assume many forms within the scope of this invention. For example, the switch 20 may be a mechanical switch wherein the first, second and third states comprise physical positions of a single pole, triple throw (SPTT) type switch—the first state (a) corresponding to a grounded position, the second (b) to a positive position, and the third (c) to a negative position. Alternatively, the switch 20 may comprise two pulse generators, e.g., two tube pulsers, each producing a pulse that is opposite in polarity to the other and timed so as not to overlap with the other. Numerous other forms of switches 20 are contemplated within the scope of this invention, and are known to those skilled in the art of electronic design. As described above, the controller 24 is used to control the state of the switch 20, and may be of conventional design, e.g., including timing circuits that set the duration and amplitude of the current pulses, which in turn cause the generation of the electric field pulses.

Note that in FIG. 2A, the switch 20 is shown as connected to only three possible positions (a), (b) or (c), each of which cause the delivery of current to the electrode 12. However, it should be understood that the switch 20 could, within the scope of the present invention, be connected to an infinite number of possible positions, each of which corresponds to a specific one of an infinite plurality of currents that are to be delivered to the cell 12 for a corresponding specific one of an infinite plurality of infinitely small time periods.

In this way the zero net charge is delivered to the first electrode 16 in response to the switch 20, or other active circuit, which configures the high voltage power supply to deliver the plurality of currents for the corresponding plurality of time periods. As a result, the zero net charge is delivered to the electrode 12 during the delivery period.

Figure 3:
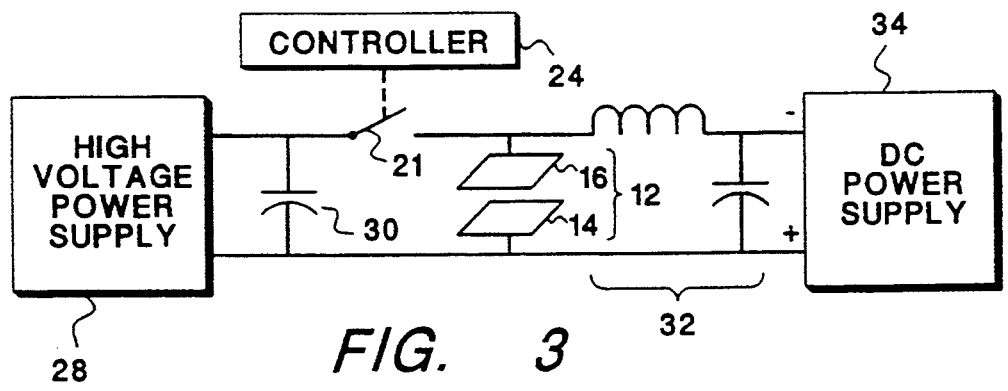
FIG. 3 is a schematic diagram of an implementation of the first embodiment of the invention as shown in FIG. 1 wherein a pulse forming network is selectively charged with a first charge by a high voltage power supply, and then discharged to the electrode; and wherein a second charge is absorbed from the electrode using a bias power supply so as to deliver a zero net charge to the electrode.

Referring next to FIG. 3, a schematic diagram is shown of an implementation of the first embodiment of the invention wherein the high voltage power supply 28 is connected in a parallel combination with the pulse forming network 30. The parallel combination is in series with a single pole, single throw (SPST) switch 21, or a equivalent switching device, and the cell 12. When the switch 21 assumes an open state, the high voltage power supply 28 charges the pulse forming network 30.

After remaining open for a period of time sufficient to charge the pulse forming network 30, the switch 21 assumes a closed state for the first prescribed period of time (or first time period), causing the pulse forming network 30 to deliver the first current through the cell 12. The first current is a relatively high current, e.g., 20,000 amperes, and the first time period is a relatively short time period, e.g., two microseconds. The delivery of the first current continues for the first prescribed time period. The high voltage power supply 28, which is in parallel with the pulse forming network 30, makes a negligible contribution to the first current.

During the second prescribed time period (or second time period), which in this embodiment follows immediately after the first prescribed time period, the switch 21 again assumes the open state, and the pulse forming network 30 is again charged by the high voltage power supply. The switch 21 assumes both the open and closed states in response to the controller 24.

Also during the second prescribed time period, a bias power supply 34, coupled in parallel with the cell 12, causes the second current to be absorbed from the first electrode 16. The second current is a relatively small current, e.g., one ampere, and the second time period is a relatively long time period, e.g., forty milliseconds. In this embodiment, the high voltage power supply 28, the pulse forming network 30, a low pass filter 32 (described below), and the bias power supply 34 together comprise the charge supply circuit 22 (FIG. 1). The low pass filter 32 and bias power supply 34 comprise the charge zeroing circuit.

Note in FIG. 3 that the bias power supply 34 remains coupled to the cell 12 during both the first and second time periods, i.e., when the switch 21 is open or closed, and also note that the low pass filter 32 is interposed between the cell 12 and the bias power supply 34 so as to protect the bias power supply 34 from the first current during the first time period. Note also that the relatively small second current makes a negligible negative contribution to the first current during the first time period.

In this way, the first current flows to the first electrode 16 during the first prescribed time period, and the second current flows from the first electrode 16 during the second time period.

As with the first embodiment as described in FIG. 2A, the first and second currents, and first and second time periods of this implementation, define equal first and second charges. Thus, the zero net charge is transferred from the electrode into the food product after the first and second prescribed time periods, i.e., after the delivery period.

Figure 4:
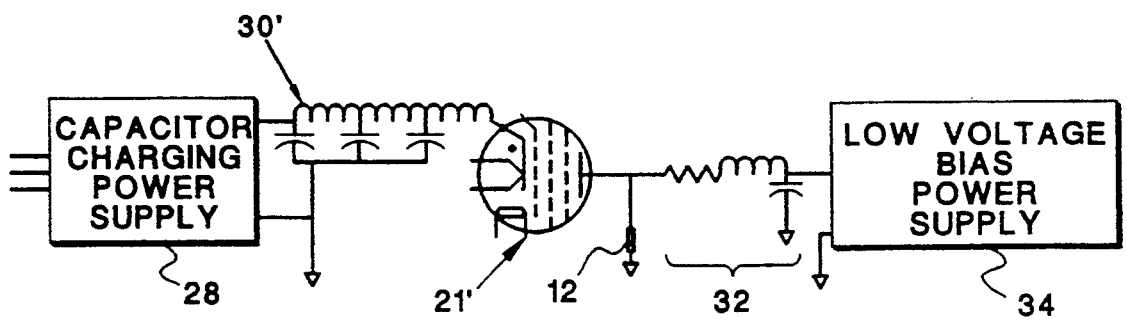
FIG. 4 is a detailed schematic diagram of the implementation of the first embodiment as shown more generally in FIG. 3.

Referring to FIG. 4, a detailed schematic diagram is shown of the implementation of FIG. 3 of the second embodiment. A thyratron switch 21' is used as the switch 20 (FIG. 3), and a series/parallel network 30' of capacitors and inductors is used as the pulse forming network 30 (FIG. 3). A suitable thyratron switch 21' for this purpose is the F-175 available from ITT Corporation, Electron Technology Division of Easton, Pa. The low pass filter 32 is designed to prevent high voltage pulses delivered from the pulse forming network 30' from damaging the bias power supply 34. This is done by choosing values of, e.g., resistance and capacitance for components within the low pass filter 32 design that adequately attenuate the relatively short high voltage pulses, but provide little attenuation to the continuous low voltage d.c. current generated by the bias power supply 34. The bias power supply 34 is selected to provide a d.c. current at a relatively low voltage, e.g., fifty volts, and in response thereto, to deliver the second or zeroing charge, which is equal and opposite to the first charge delivered to the cell 12 by the pulse forming network 30'.

Figure 5:
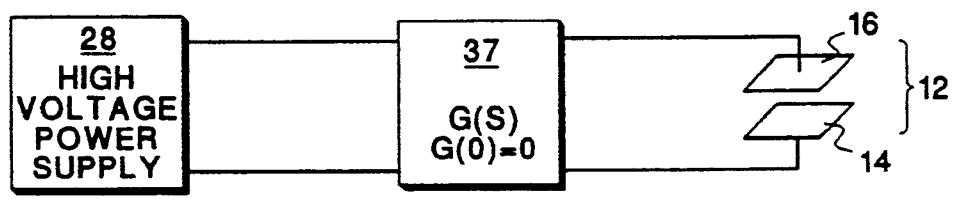
FIG. 5 is a schematic diagram of a second embodiment of the present invention as shown in FIG. 1 wherein a high voltage power supply, and a passive circuit having a transconductance function G(s), wherein s is a generalized frequency, and wherein G(0)=0, are used to deliver the zero net charge to the electrode.

Referring next to FIG. 5, a second embodiment of the present invention is shown wherein a passive circuit 37, having transconductance function $G(s)$, is coupled with the high voltage power supply 28, and the cell 12. The transconductance function $G(s)$ has a characteristic that for $s=0$, $G(0)=0$, or, in other words, the passive circuit 37 does not pass d.c. Several implementations of the passive circuit 37 that can be utilized to realize this second embodiment are described below in FIGS. 6–14.

Figure 6A:
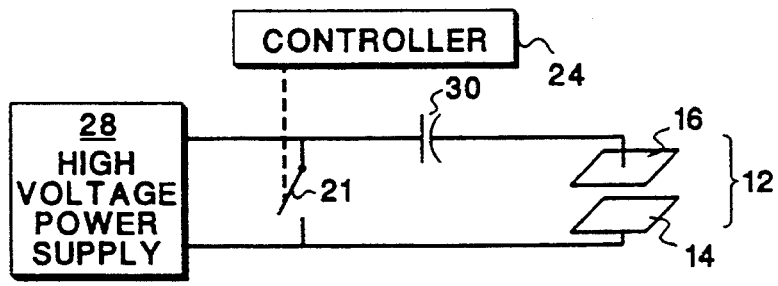
FIG. 6A is a first implementation of the second embodiment wherein a pulse forming network is slowly charged through the electrode, and then quickly discharged through the electrode.
Figure 6B:
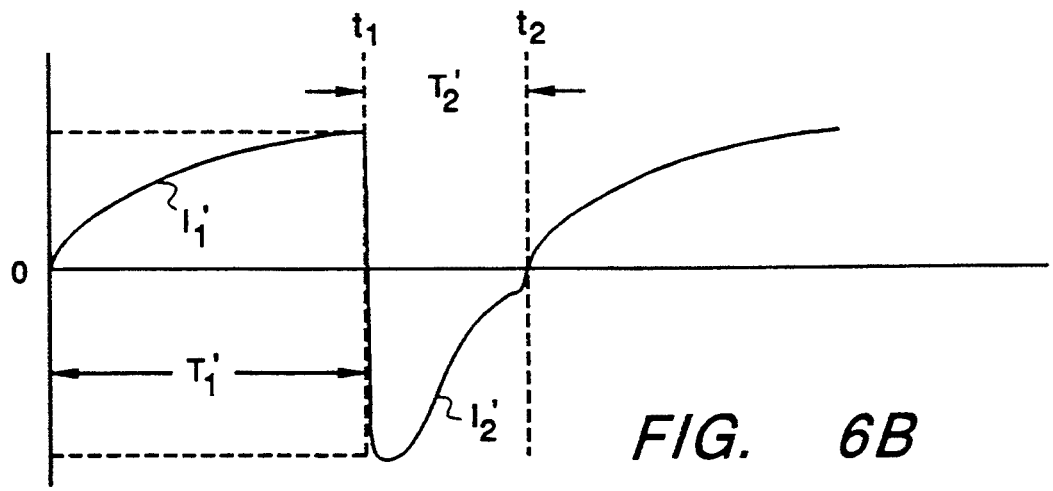
FIG. 6B is an exemplary graph showing the first current and the second current, generated by the second embodiment as shown in FIG. 6A, on the vertical axis, and showing a first time period and a second time period, during which the currents, respectively, are generated, on the horizontal axis.

Referring next to FIG. 6A, a first implementation of the second embodiment is shown wherein the SPST switch 21 or equivalent switching device, is coupled in a parallel combination to the high voltage power supply 28. Such parallel combination is connected in series with a pulse forming network 30 and the cell 12. In this embodiment, the power supply 28 and the pulse forming network 30 comprise the charge supply circuit 22 (FIG. 1). When the switch 21 is in a first state, i.e., an open state, the power supply 28 slowly charges the pulse forming network 30 through the cell 12, causing a relatively small first current $I_1'$, as illustrated in FIG. 6B, to flow from the first electrode 16, effectively into the food product 10, and effectively into the second electrode 14. Note that in this embodiment, the first current $I_1'$ will generally not be sufficiently large to kill microorganisms. When the switch 21 is in the open state, the switch 21 does not make an electrical connection, i.e., it is an open circuit, between its terminals. Thus, the power supply 28, the pulse forming network 30, and the first electrode 16 are connected in series whenever the switch 21 is in the open state.

The switch 21, controlled by the controller 24, assumes the open state for the first prescribed time period, $T_1'$, and then assumes a closed state for the second prescribed time period, $T_2'$, as illustrated in FIG. 6B. The switch 21 assumes each of these states as controlled by the controller 24. No delay periods, between, before, or after the first and second time periods, are used in this implementation. In the closed state, the pulse forming network 30 quickly discharges through the switch 21, causing a relatively high second current $I_2'$ to effectively flow from the first electrode 16. Note that the pulse forming network 30 can also be referred to as the charge zeroing circuit during the second prescribed time period. The second current is sufficiently large to kill microorganisms.

When the switch 21 is in the closed state, the switch 21 makes an electrical connection, i.e., it is a short circuit, between its terminals. Thus, the pulse forming network 30 and the cell 12, including the first and second electrodes 16, 14, are connected in series whenever the switch 21 is in the closed state, causing the power supply 28 to be effectively shorted out. (Note, the high voltage power supply contains internal short-circuit protection that prevents damage to it during the time the switch 21 is closed).

The first period $T_1'$ and the small first current $I_1'$ define the first charge that is delivered to the first electrode 16, and the second period $T_2'$ and the larger second current $I_2'$ define the second charge that is absorbed from the first electrode 16. Because the first and second charges are substantially equal, the zero net charge is delivered to the electrode 16, i.e., through the cell 12.

Figure 7:
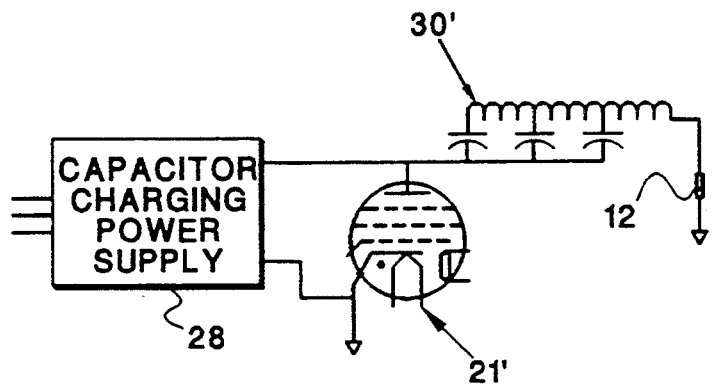
FIG. 7 is a detailed schematic diagram of the first implementation of the second embodiment of the invention as shown more generally in FIG. 3.

Referring next to FIG. 7, a detailed schematic diagram is shown of the first implementation of the second embodiment. A thyratron switch 21' is used to provide the function of the switch 21 (FIG. 6A), and a series/parallel network 30' of capacitors and inductors is used as the pulse forming network 30 (FIG. 6A). The thyratron switch 21' may be the same as the thyratron switch 21' described above in connection with FIG. 4. Of course, other types of switch devices that provide the SPST switch function could also be used, such as triodes, bipolar junction transistors, field effect transistors, silicon controlled rectifiers, and the like.

Figure 8:
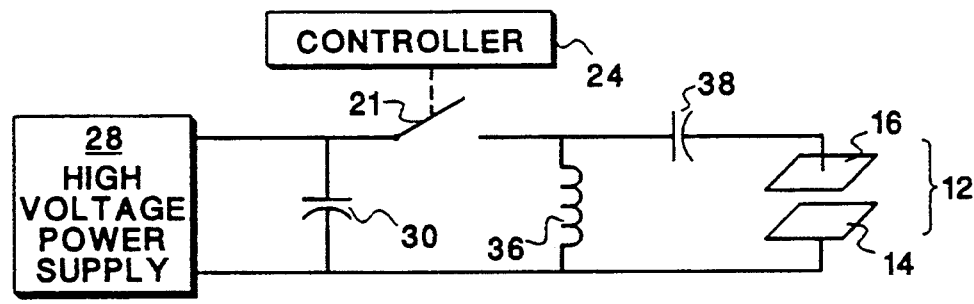
FIG. 8 is a schematic diagram of a second implementation of the second embodiment as shown in FIG. 5 wherein a pulse forming network is selectively charged with a first charge by a high voltage power supply, and then discharged through a coupling capacitor to the electrode; and wherein a second charge from the coupling capacitor is absorbed from the electrode, and discharged into a discharge element.

Referring next to FIG. 8, a second implementation of the second embodiment of the present invention is shown wherein the high voltage power supply 28 is connected in parallel combination with the pulse forming network 30, and such parallel combination is connected in series with the SPST switch 21, and a discharge element 36. The cell 12 is connected in parallel across the discharge element 36 through a coupling capacitor 38. The high voltage power supply 28, the pulse forming network 30, the discharge element 36, and the coupling capacitor 38 function as the charge supply circuit 22 (FIG. 1) in this embodiment. The discharge element 36 and the coupling capacitor 38 function as the charge zeroing circuit.

In operation, the SPST switch 21 first assumes the open state for a period of time sufficient to charge the pulse forming network 30. In response to the switch 21 assuming the open state, the high voltage power supply 28 charges the pulse forming network 30. Second, the switch 21 assumes the closed state for the first prescribed period of time. In response to the switch 21 assuming the closed state, the pulse forming network 30 discharges through the coupling capacitor 38 causing the first current to flow to the first electrode 16.

Separate from the first current, a portion of the pulse forming network's discharge occurs through the discharge element 36. However, the impedance of the discharge element 36 is selected such that most of the energy is discharged through the cell 12, i.e., the impedance of the discharge element 36 is very high relative to the impedance of the pulse forming network 30. Furthermore, the coupling capacitor 38 is selected so as to have a capacitance much larger, e.g., on the order of one-hundred times greater, than the capacitance of the pulse forming network 30 such that most, e.g., on the order of 99%, of the voltage drop caused by the first current occurs across the cell 12, i.e., between the first and second electrodes 16, 14 and not across the coupling capacitor 38.

After the first prescribed time period, the switch 21 returns to the open state for a second prescribed time period. While the switch 21 is in the open state, the coupling capacitor 38 discharges through the discharge element 36, thereby causing the second current to flow through the cell 12 for the second period of time. Also during the second period of time, the power supply 28 again charges the pulse forming network 30, as described above. The SPST switch 21 assumes both the closed and open states as controlled by the controller 24.

In this way the current, caused by the discharging of the pulse forming network 30, is delivered to the first electrode 16 during the first time period, and the second current, caused by the discharging of the coupling capacitor 38, is absorbed from the first electrode 16 during the second time period. Generally in this embodiment, the second current is much smaller than the first current, and the second time period is much longer than the first time period.

As in the above embodiments, the first current and first time period define a first charge to be delivered to the first electrode 16, and the second current and the second time period define a second charge to be absorbed from the first electrode 16. By appropriately selecting such currents and time periods, the first and second charges are made to be equal charges and the zero net charge is transferred to the first electrode 16, i.e., through the cell 12, after the first and second time periods.

Figure 9:
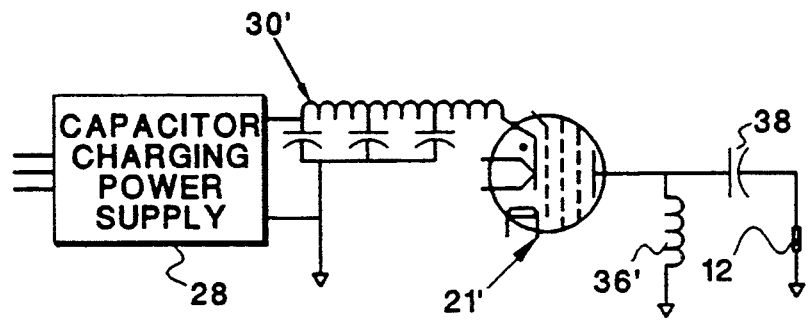
FIG. 9 is a detailed schematic diagram of the second implementation of the second embodiment of the present invention as shown more generally in FIG. 8.

Referring to FIG. 9, a detailed schematic diagram of the second implementation of the second embodiment. Again, a thyratron switch 21' is used as the switch 21 (FIG. 8), and a series/parallel network 30' of capacitors and inductors is used as the pulse forming network 30 (FIG. 8). An inductor 36' is used as the discharge element 36. Representative values of the inductor 36' and the coupling capacitor 38 are 10 mH and 100 μF, respectively.

Figure 10:
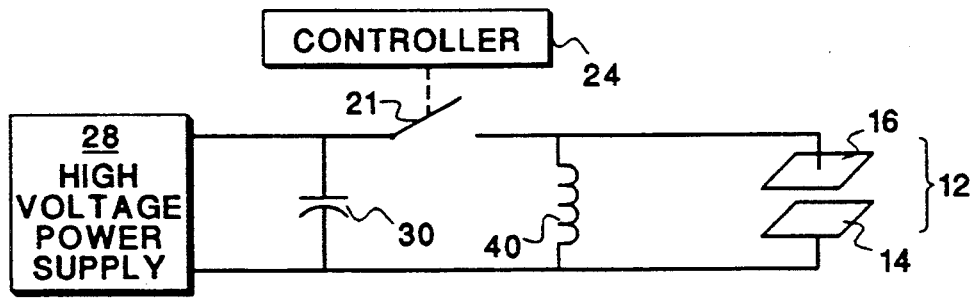
FIG. 10 is a schematic diagram of a third implementation of the second embodiment as shown in FIG. 5 wherein a pulse forming network is selectively charged with a first charge by a high voltage power supply, and then discharged to the electrode; and wherein a second charge is absorbed from the electrode into a shunt inductor.

Referring to FIG. 10, a third implementation of the second embodiment of the invention is shown. This embodiment is similar to the second implementation of the second embodiment, except that it lacks the coupling capacitor 38, and the discharge element 36 consists of a shunt inductor 40. In other words, the third implementation consists of the high voltage power supply 28 connected in a parallel combination with a pulse forming network 30. Such parallel combination is further connected in series with the SPST switch 21, and the shunt inductor 40; with the cell 12 being connected in parallel with the shunt inductor 40. The high voltage power supply 28, the pulse forming network 30, and the inductor function as the charge supply circuit 22 (FIG. 1) in this embodiment. The shunt inductor 40 functions as the charge zeroing circuit.

During a charging time period of sufficient duration, the pulse forming network 30 is charged as described above in connection with the second implementation. At the end of this charging period, the switch 21 switches to the closed state and the first current begins to flow to the first electrode 16 for the first time period.

Figure 11:
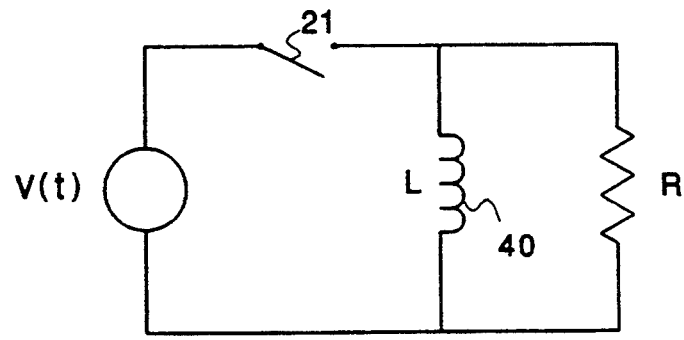
FIG. 11 is a schematic diagram of a model circuit used to approximate the circuit of the third implementation of the second embodiment as shown in FIG. 10.

FIG. 11 illustrates the operation of the third implementation of the second embodiment. In FIG. 11, the third implementation of the second embodiment of FIG. 10 is approximated by a voltage supply V(t), which corresponds to the high voltage power supply 28 and the pulse forming network 30, connected in series with a switch 21 and a parallel combination that includes the shunt inductor 40 and a resistance R. The resistance R approximates the total resistance of the first electrode 16, the food product 10, and the second electrode 14, i.e., the resistance of the cell 12.

During the first time period, a first current flows through the cell 12, and a second current begins to flow in the shunt inductor 40, which causes a magnetic field to expand around the shunt inductor 40 as is known in the art. In response to the first current, the first charge is delivered to the first electrode 16. After the first time period, the switch 21 assumes the open state in response to the controller 24. As a result, the first current ceases to flow through the cell 12 and the second current continues to flow through the shunt inductor 40 as the magnetic field begins to collapse. Consequently, the second current begins to flow from the first electrode 16, and the second charge is transferred from the first electrode 16. The inductance of the shunt inductor 40 and the duration of the first time period are selected so as to cause the first charge to be substantially equal to the second charge, thereby causing the zero net charge to flow to the first electrode 16 after the first and second time periods.

Figure 12:
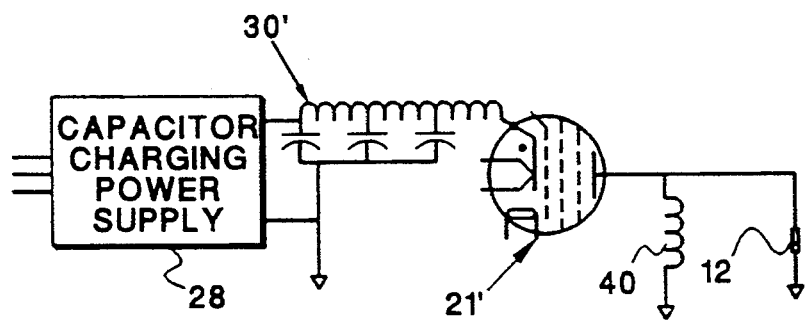
FIG. 12 is a detailed schematic diagram of the third implementation of the second embodiment of the present invention as shown more generally in FIG. 10.

Referring next to FIG. 12, a detailed schematic diagram is shown of the third implementation of the second embodiment. As above, the thyratron switch 21' is used as the SPST switch 21 (FIG. 10), and the series/parallel network 30' of capacitors and inductors is used as the pulse forming network 30 (FIG. 10).

Figure 13:
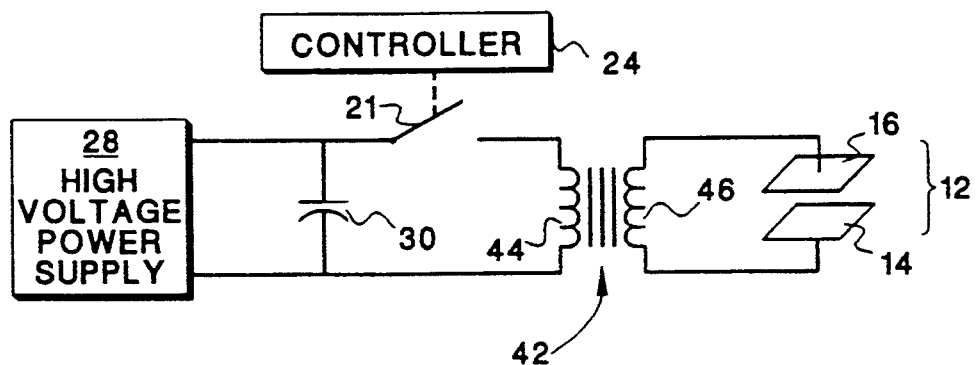
FIG. 13 is a schematic diagram of a fourth implementation of the second embodiment of the present invention as shown in FIG. 5, wherein a pulse forming network is selectively charged with a first charge by a high voltage power supply, and then discharged through a pulse transformer to the electrode; and wherein a second charge from the electrode is absorbed by the pulse transformer.

Referring next to FIG. 13, a fourth implementation of the second embodiment of the invention is shown wherein the shunt inductor 40 is replaced by a pulse transformer 42. A primary coil 44 of the transformer 42 is coupled in series with the pulse forming network 30 and the SPST switch 21, and a secondary coil 46 of the transformer 42 is coupled in series with the cell 12. As in the third implementation (FIGS. 10 and 12) the high voltage power supply 28 is in parallel with the pulse forming network. In this implementation, the high voltage power supply 28, the pulse forming network and the transformer 42 function as the charge supply circuit 22 (FIG. 1). The pulse transformer 42 serves as the charge zeroing circuit.

The fourth implementation functions similarly to the third implementation of FIGS. 10 and 12 with the pulse transformer 42 having a magnetizing inductance that is designed to function as the shunt inductance of the shunt inductor 40 (FIGS. 10 and 12). In this way, the first and second charges are delivered to (or absorbed from) the first electrode 16. Because, as above, the first and second charges are equal charges, the zero net charge passes through the cell 12 after the first and second time periods.

Figure 14:
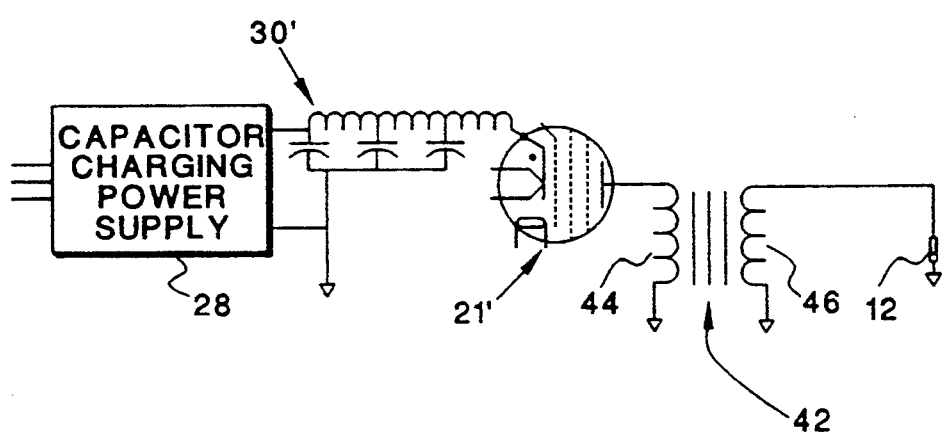
FIG. 14 is a detailed schematic diagram of the fourth implementation of the second embodiment of the invention as shown more generally in FIG. 13.

FIG. 14 shows a detailed schematic diagram of the fourth implementation of the second embodiment. As above, the thyratron switch 21' functions as the SPST switch 21 (FIG. 13), and a series/parallel network 30' of capacitors and inductors is used as the pulse forming network 30 (FIG. 13). The pulse transformer 42 may be of conventional design, having a peak current capacity of, e.g., 20,000 amps.

While the invention herein disclosed has been described by means of specific embodiments and applications thereof, numerous modifications and variations could be made thereto by those skilled in the art without departing from the scope of the invention as set forth in the claims.

What is claimed is:

1. A method for killing microorganisms in a food product, said food product containing a fouling agent that agglomerates on an electrode in response to the passing of a net charge between the electrode and the food product, said agglomeration causing the fouling of the electrode, said method including the steps of:
    (a) positioning the electrode in the supply of the food product;
    (b) applying a first voltage signal to the electrode for a first prescribed period of time, said first voltage signal causing a first current to flow to the electrode, said first current and said first prescribed period defining a first charge; and
    (c) applying a second voltage signal to the electrode for a second prescribed period of time, said second voltage signal causing a second current to flow from the electrode, said second current and said second prescribed period of time defining a second charge, wherein said first charge and said second charge are substantially equal charges;
    whereby the net charge transferred to the electrode after the first prescribed period of time and the second prescribed period of time is approximately zero;
    whereby the agglomeration of the fouling agent on the electrode is reduced.

2. The method of claim 1 wherein said first voltage signal is relatively larger than said second voltage signal, and wherein said first prescribed time period is relatively shorter than said second prescribed time period.

3. The method of claim 1 including:
    (d) repeating step (b) and step (c) for a prescribed operating period.

4. A system for killing microorganisms in a food product, said food product containing a fouling agent that agglomerates on an electrode in response to the passing of a net charge between the electrode and the food product, said agglomeration causing fouling of the electrode, said system including:
    means for establishing a supply of food product in electrical contact with the electrode;
    means for delivering a first charge from a charge supply circuit to the electrode; and
    means for delivering a second charge to the charge supply circuit from the electrode; and
    means for making said first charge and said second charge substantially equal charges such that the net charge transferred to the electrode over a prescribed period of time is approximately zero;
    whereby the fouling of the electrode is reduced.

5. The system of claim 4 wherein said first delivering means comprises:
    power supply means for supplying a source current;
    charge storage means for storing the source current as said first charge; and
    charge coupling means for selectively discharging said first charge from the charge storage means into the electrode.

6. The system of claim 5 wherein said second delivering means includes discharge means for absorbing said second charge from said electrode.

7. The system of claim 6 wherein said charge storage means comprises at least one capacitor, and wherein said charge coupling means comprises a switch.

8. An apparatus for killing microorganisms in a food product, said apparatus including:
    an electrode in electrical contact with a supply of the food product, which supply of food product contains a fouling agent that agglomerates on the electrode in response to the transfer of a net charge between the electrode and the supply, said agglomeration causing the fouling of the electrode;
    a pulse forming network coupled to the electrode, wherein the pulse forming network is capable of delivering a pulse voltage signal to the electrode;
    a power supply coupled to the pulse forming network, wherein said power supply charges the pulse forming network to the pulse voltage signal;

a charge zeroing circuit coupled to the electrode, wherein the charge zeroing circuit delivers a net charge zeroing voltage signal to the electrode; and a switch coupled to the pulse forming network and to the charge zeroing circuit, said switch having a first state in response to which the pulse voltage signal is delivered to the electrode, which pulse voltage signal causes a first charge to be transferred to the electrode, and said switch having a second state in response to which the net charge zeroing voltage signal is delivered to the electrode, which net charge zeroing voltage signal causes a second charge to be transferred from the electrode, said first charge being approximately equal to said second charge such that the net charge delivered to the electrode in response to the switch serially assuming the first and second states is approximately zero;

whereby the fouling of the electrode is reduced.

9. The apparatus of claim 8 wherein said pulse forming network includes at least one capacitor, and wherein said charge zeroing circuit also includes said at least one capacitor.

10. The apparatus of claim 9 wherein said switch is in a parallel combination with said power supply, and wherein said pulse forming network and said electrode are in series with the parallel combination.

11. The apparatus of claim 8 wherein said pulse forming network includes at least one capacitor, and wherein said charge zeroing circuit includes a d.c. power supply.

12. The apparatus of claim 11 wherein said pulse forming network is in a parallel combination with said power supply, wherein said electrode is in series with said switch and said parallel combination, and wherein said charge zeroing circuit is in parallel with said electrode.

13. The apparatus of claim 8 wherein said pulse forming network includes at least one capacitor, and wherein said charge zeroing circuit includes a discharge element through which said second charge is transferred.

14. The apparatus of claim 13 wherein said pulse forming network is in a first parallel combination with said power supply, wherein said electrode is in a second parallel combination with said discharge element, and wherein said second parallel combination is in series with said first parallel combination and said switch.

15. The apparatus of claim 13 wherein said charge zeroing circuit further includes a coupling capacitor through which the pulse forming network delivers the pulse voltage signal.

16. The apparatus of claim 15 wherein said pulse forming network is in a first parallel combination with said power supply, wherein said electrode is in a first series combination with said coupling capacitor, wherein said series combination is in a second parallel combination with said discharge element, and wherein said second parallel combination is in series with said first parallel combination and said switch.

17. The apparatus of claim 8 wherein said pulse forming network includes at least one capacitor, and wherein said charge zeroing circuit includes a pulse transformer.

18. The apparatus of claim 17 wherein said pulse forming network is in a parallel combination with said power supply, wherein a primary coil of said pulse transformer is in series with said parallel combination and said switch, and wherein said electrode is in series with a secondary coil of said pulse transformer.

19. An apparatus for reducing the fouling of an electrode that is in electrical contact with a supply of food product, wherein the supply of food product contains a fouling agent that agglomerates on the electrode in response to the passing of a net charge to the electrode, said agglomeration causing the fouling of the electrode, said apparatus comprising:

a charge supply circuit coupled to the electrode;

a switch coupled to the charge supply circuit, said switch having a first state in which the switch configures the charge supply circuit to deliver a charge to the electrode, said switch having a second state in which the switch configures the charge supply to substantially absorb the charge from the electrode; and controller means coupled to the switch for controlling the switch to assume the first state and the second state so that the charge delivered to the electrode is approximately zero over a prescribed period of time;

whereby the fouling of the electrode is reduced.

20. The apparatus of claim 19 wherein said charge supply circuit includes a power supply, and a pulse forming network that includes at least one capacitor.

21. An apparatus for killing microorganisms in a food product, said food product containing a fouling agent that agglomerates on an electrode in response to the delivery of a non-zero net charge to said electrode, said apparatus including:

a current generator coupled to the electrode, wherein the current generator causes the delivery to the electrode of at least one current pulse during a specified time period, wherein the at least one current pulse defines at least one charge, and wherein an electric field resulting from the at least one current pulse passes through the food product in response to the delivery of the at least one charge and kills the microorganisms; and charge zeroing means for causing a zeroing charge to be delivered to the electrode during the specified time period that, together with the at least one charge causes an approximately zero net charge to be delivered to the electrode within the delivery period.

22. The apparatus of claim 21 wherein the charge zeroing means includes bias power supply means for delivering a bias current for a zeroing period, wherein the bias current and the zeroing period define said zeroing charge.

23. The apparatus of claim 21 wherein the charge zeroing means includes a passive circuit means having a transconductance function G(s) wherein s is a generalized frequency, and wherein G(0)=0.

24. The apparatus of claim 23 wherein the charge zeroing means includes pulse forming network means for being charged by said current generator in response to a switching device assuming an open state, and for being discharged in response to the switching device assuming a closed state, wherein said pulse forming network means is also for delivering said at least one charge when the pulse forming network means discharges and for delivering said zeroing charge when the pulse forming network means charges.

25. The apparatus of claim 23 wherein the charge zeroing means includes coupling capacitor means for charging with said at least one charge in response to the delivery to said electrode of said at least one charge through the coupling capacitor means, and discharge element means for delivering said zeroing charge to said electrode by discharging said at least one charge from the coupling capacitor means.

26. The apparatus of claim 23 wherein the charge zeroing means includes shunt inductor means for generating an expanding magnetic field in response to said delivery to said electrode of said at least one charge, and for generating said zeroing charge in response to the collapsing of the magnetic field.

27. The apparatus of claim 23 wherein the charge zeroing means includes pulse transformer means for causing expanding of a magnetic field in response to said delivery to said electrode of said at least one charge, and for generating said zeroing charge in response to collapsing of the magnetic field.

* * * * *